United States Patent
Cohen et al.

(10) Patent No.: US 8,335,749 B2
(45) Date of Patent: Dec. 18, 2012

(54) GENERATING A SET OF ATOMS

(75) Inventors: Ira Cohen, Modiin (IL); Michal Aharon, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 12/695,788

(22) Filed: Jan. 28, 2010

(65) Prior Publication Data

US 2011/0184894 A1    Jul. 28, 2011

(51) Int. Cl.
  *G06F 15/18*    (2006.01)
(52) U.S. Cl. ......................................... 706/12

(58) Field of Classification Search ............... 706/12
  See application file for complete search history.

(56) References Cited

U.S. PATENT DOCUMENTS 7,266,536 B2 * 9/2007 Cohen et al. ............... 706/52
7,720,771 B1 * 5/2010 Anderson et al. ........... 706/12

* cited by examiner

*Primary Examiner* — Michael B Holmes

(57) ABSTRACT

An automated method comprises receiving training data representing an initial data set including text representing at least one concept embodied by the data set, using the training data in order to generate a set of atoms, each atom comprising at least one word that represents one or more concepts of the initial data set, wherein generating a set of atoms comprises minimizing a cost function using an iterative process to identify one or more atoms.

16 Claims, 3 Drawing Sheets

GENERATING A SET OF ATOMS

BACKGROUND

In many areas there is a desire to characterize objects according to the elements from which they comprise. Examples can be found in various fields such as software event stream analysis, which aims to discover sequences of events that describe different states in a system running complex applications using event log analysis for example. Existing research in the area of automated log analysis focuses on discovery of temporal patterns, or correlation of event statistics, within the events. Such techniques are typically based on knowledge of which event messages can occur, or require access to the source code of software that generates the event messages in order to determine which event messages can occur. In general, the research does not accommodate the complexities of real world systems, in which logs may be generated by various different components in a complex system, leading to, for example, interleaving of sequences of events, asynchronous events and high dimensionality.

An alternative scenario is document characterization, which aims to describe and characterize documents in a corpus according to the concepts they discuss by using the words from which the documents are composed. Following characterization, each document in the corpus, or indeed new documents added thereto, can generally be represented sparsely using these concepts. The representation can be used as an aid in keyword extraction, or concept based retrieval and search for example. Document characterization works can use probabilistic latent semantic indexing for example, to produce models that capture latent concepts in documents using a corpus of training documents and different finite mixture models. In general, existing approaches for characterizing a corpus of documents use a compressed representation of the data which is learned from data through probability distributions over words and concepts.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
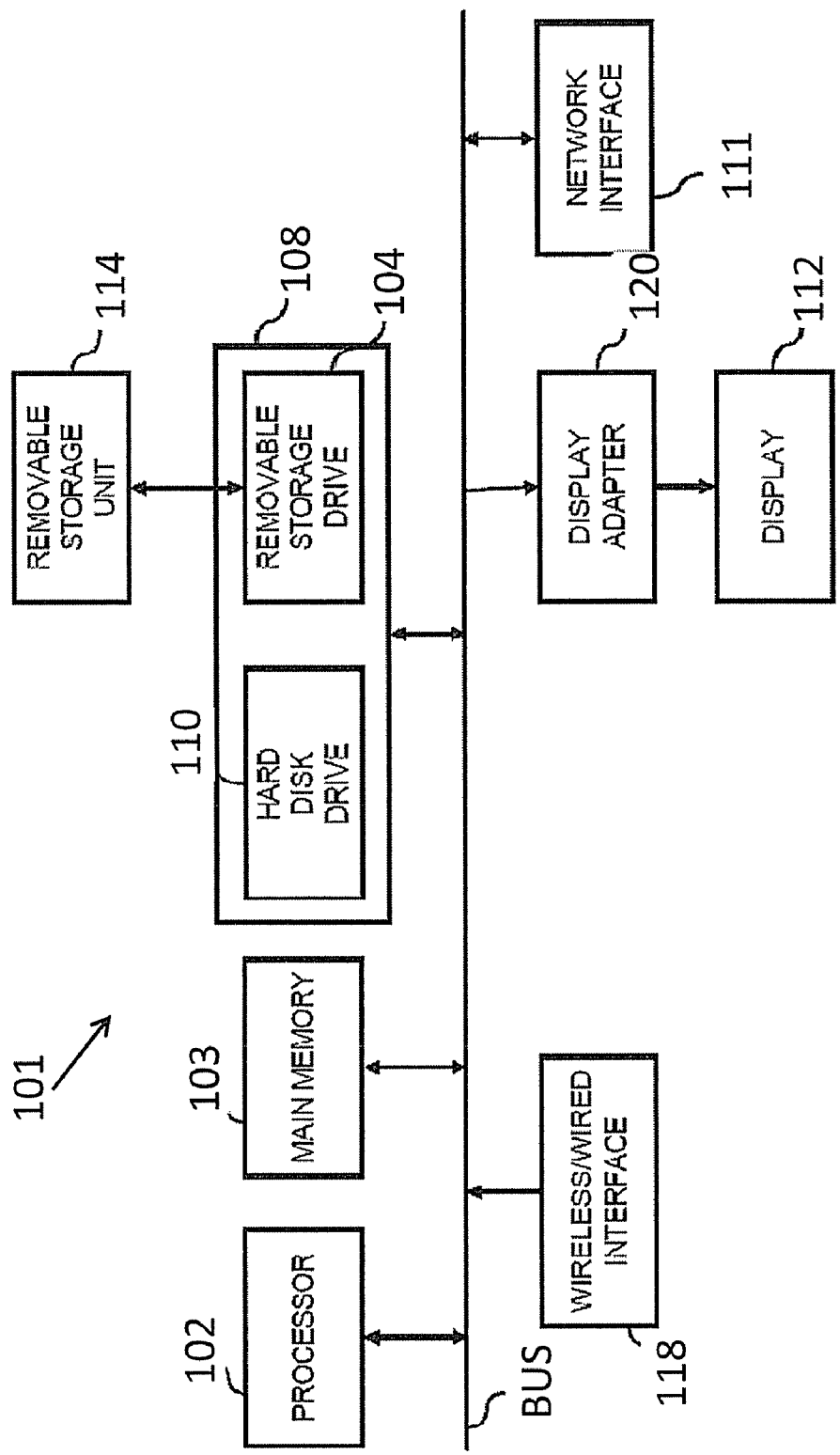
FIG. 1 is a functional block diagram depicting an architecture of a computing apparatus 101 suitable for use in the process of determining a set of atoms according to certain embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first item could be termed a second item, and, similarly, a second item could be termed a first item, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments relate—generally—to an approach for solving a characterization problem for sets of data items. According to an embodiment, this can be accomplished by determining a dictionary of atoms for objects of interest. An atom can be defined as a set of elements that is common in many samples contained in a data set, and therefore is potentially meaningful in some sense. As such, a new or existing set can be sparsely represented using such atoms.

According to embodiments, a collection of data sets each comprises a plurality of elements (such as words for example) originating from an alphabet of elements. The collection can be, for example, a corpus of documents, event sequences or event logs or any other collection of objects comprised of elements. The content of each set can be represented by a union of L atoms for the collection. Accordingly, for a collection comprising N N differing sets of elements denoted $D=\{D_1, D_2, \ldots, D_N\}$, each of which comprises a set of elements from an alphabet $v_1, v_2, \ldots, v_T$, there is, according to an embodiment, a set of atoms $A=\{A_1, A_2, \ldots, A_K\}$ such that a representation of a data set $D_i$ by a set of atoms can be denoted as $F(A, R_i)$, where $R_i$ is a set of indices, and $$F(A, R_i) = \bigcup_{j \in R_i} A_j.$$

Then, $F(A,R)$ denotes the set of all representations, that is to say $F(A,R)=\{F(A,R_i) | 1 \leq i \leq |R|\}$.

Accordingly, given an input data set (which may be a data set from the collection, or a new data set which is not part of the collection, as will be described in more detail below), a set of atoms, and imposing a limitation on the number of atoms which can be used, the input set can be represented as the union of certain ones of the atoms. More specifically, groups of elements, or objects, for the input data set can be represented using the atoms. There can be one or more possible representations that exactly construct the elements, reflecting the possibility that atoms can comprise combinations of elements which are themselves sub-sets of one another. Alternatively, there may be none. In the latter case, a representation which best approximates the input set can be used, as will be described below. In addition, an object may include a potentially large number of elements that are not necessarily related to any atom. For example, a document may contain certain words describing two concepts (from possibly two or more atoms), and additional words unrelated to either of the two concepts.

It will be appreciated therefore that, in the example of a set of documents, atoms for the set would be expected to comprise words relating to certain concepts, such that each document comprises a portion of the words of some of the atoms as well as 'noise' (which would be other words which are not necessarily in any of the atoms in the this example).

The elucidation of a set of atoms will now be described with reference to FIGS. 1 and 2. FIG. 1 is a functional block diagram depicting an architecture of a computing apparatus 101 suitable for use in the process of determining a set of atoms according to certain embodiments of the invention and processing such atoms in response to further input data, such as a new document for example, which is required to be sparsely represented. The apparatus comprises a data processor 102, which can include one or more single-core or multi-core processors of any of a number of computer processors, such as processors from Intel, AMD, and Cyrix for example. As referred to herein, a computer processor may be a general-purpose processor, such as a central processing unit (CPU) or any other multi-purpose processor or microprocessor. The processor 102 comprises one or more arithmetic logic units (not shown) operable to perform operations such as arithmetic and logical operations of the processor 102.

Commands and data from the processor 102 are communicated over a communication bus or through point-to-point links (not shown) with other components in the apparatus 101. More specifically, the processor 102 communicates with a main memory 103 where software can be resident during runtime. A secondary memory (not shown) can be used with apparatus 101. The secondary memory can be, for example, a computer-readable medium that may be used to store software programs, applications, or modules that implement embodiments of the invention, or parts thereof. The main memory 103 and secondary memory (and optionally a removable storage unit 114) each includes, for example, a hard disk drive 110 and/or a removable storage drive such as 104, which is a storage device connected to the apparatus 101 via a peripherals bus (such as a PCI bus for example) and representing a floppy diskette drive, a magnetic tape drive, a compact disk drive, etc., or a non-volatile memory where a copy of the software is stored. In one example, the secondary memory also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. Apparatus 101 can optionally comprise a display 112 connected via the peripherals bus (such as a PCI bus), as well as user interfaces comprising one or more input devices, such as a keyboard, a mouse, a stylus, and the like. A network interface 111 can be provided for communicating with other computer systems via a network.

Embodiments of the present invention can be implemented by a dedicated hardware module, such as an ASIC, in one or more firmware or software modules, or in a combination of the same. A firmware embodiment would typically comprise instructions, stored in non-volatile storage, which are loaded into the CPU 102 one or more instructions at a time. A software embodiment would typically comprise one or more application programs that is/are loaded from secondary memory into main memory 103, when the programs are executed.

Figure 2:
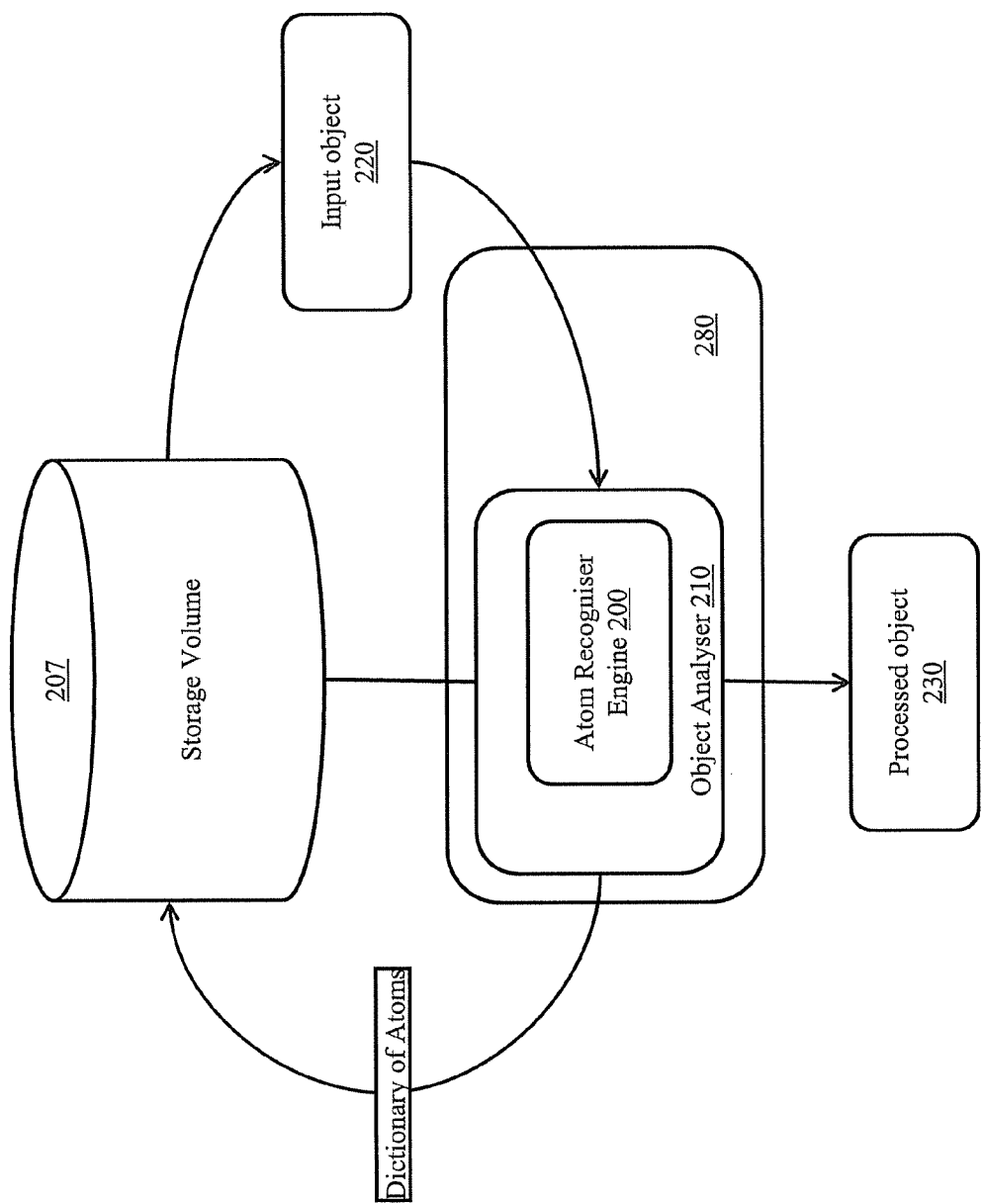
FIG. 2 is a functional block diagram of certain elements of a system for determining a set of atoms according to an embodiment.

Referring now, to FIG. 2, there is depicted a functional block diagram of certain elements of a system for determining a set of atoms according to an embodiment.

According to an embodiment, an atom recogniser engine 200 is arranged to identify atoms which can be used to sparsely represent a set of documents. The atom recogniser engine is part of an object analyzer module 210, which can take as input data representing a data set to be analysed, such as data representing a corpus of documents for example. The corpus of documents is in a machine-readable form, such that individual elements/words of each document can be determined. The data set can be provided by a storage volume 207 which comprises, for example, a HDD such as described above with reference to FIG. 1. The data from the storage volume 207 is used in a training phase in order to determine a set of representative atoms. Process steps according to an embodiment can occur with a computing sub-system 280 which can be a system as described with reference to FIG. 1. Storage volume 207 can be an integral part of the computing apparatus, or can be remote therefore (as depicted in the exemplary system of FIG. 2).

Accordingly, atom recogniser engine 200 operates to find a set of atoms A and a set of representations R that minimize the sum of distances between $F(A,R_i)$ and $D_i$ for $1 \leq i \leq N$. A respective cost function can therefore be defined as:

$$\{A, R\} = \operatorname*{argmin}_{A,R} \sum_{i=1}^{N} d(D_i, F(A, R_i)) \text{ s.t.} \forall_i \; |R_i| \leq L, \; |A| \leq k, \quad \text{(Eqn. 1)}$$

where d is a distance metric between sets $D_i$ and $F(A,R_i)$. The output of the atom recogniser engine 200 depends heavily on the definition of the distance function d.

According to one embodiment, a relatively simple distance function d counts the number of elements that are not common in the two sets, and normalizes it by the size of $D_i$:

$$d(D_i, F(A, R_i)) = \frac{|D_i \otimes F(A, R_i)|}{|D_i|}, \quad \text{(Eqn. 2)}$$

where $\otimes$ is the XOR operator that returns the set of elements that appear in one set and not in the other.

However, such a simple distance function is unable to consider cases in which only part of the atom appears in $D_i$. If this is perceived to be important, then an alternative distance function, which uses a slack parameter, r, can be applied:

$$d^r(D_i, F(A, R_i)) = d(D_i, B(F(A, R_i), D_i, r)), \quad \text{<Eqn. 3>}$$

where $$B(F(A, R_i), D_i, r) = F(\tilde{A}, R_i), \quad \text{<Eqn. 4>}$$

and $$\tilde{A}_i = \operatorname*{argmin}_{\tilde{A}} d(D_i, F(\tilde{A}, R_i))$$

for $\tilde{A} \subset A_i$, $|\tilde{A}_i| \geq r \cdot |A_i|$. That is, the distance function is permitted to consider only a portion r of the elements of each atom in the representation, thereby reducing the penalty for mismatches. When r=1, the function $d^r$ is identical to d. As the solution of Equation 1 is combinatorial in its nature, an iterative scheme can be applied to minimizing it. Calculating $d(D_i,$ F(A,R$_i$)), given R$_i$ and A is relatively straightforward; by picking at least r·|A$_j$| elements from A$_j$ for each j∈R$_i$, whose union most resembles Di.

Given the above data generation model and definition of a data representation error, a cost function is defined according to an embodiment, which needs to be optimized for discovering the set of atoms from a given data set, without knowledge of either the number of atoms in the dictionary, nor the number of atoms representing each data object. Without knowledge of these two, simply minimizing the representation error leads to one of two trivial solutions with zero representation error: either set each atom to represent a data object, or set each atom to be one of the elements from the alphabet. Therefore, we would like our cost function to result in some sense of compression, while maintaining a good representation error.

We denote such a cost function as PCF, and define it as follows:

$$PCF_r(D, A, R) = \underbrace{\sum_{i=1}^{N}(d_r(D_i, Rep(A, R_i)))}_{PCF_A} + \underbrace{\sum_{i=1}^{N}\mu_i|R_i|}_{PCF_B} + \underbrace{\tau|A|}_{PCF_C},$$

where $$\mu_i = \frac{1}{|D_i|}.$$

The principles for designing this cost function are explained below.

PCF$_A$—Minimization of the representation error is required. Otherwise, there might not be any connection between the dictionary, representations and the data.

PCF$_B$—Minimizing the size of all representations is important to prevent the algorithm from converging to the second trivial solution, in which R$_i$=D$_i$. This part also adds a sense of 'compression' to the resulted representation, as it justifies adding another atom to the representation only if this addition reduces the representation error in more than one element.

PCF$_C$—Minimizing the number of atoms in the dictionary is important to prevent the algorithm from converging to the first trivial solution, in which A=D. The value we set for τ will eventually control how frequent would we want some set repetition in the data, in order for it to become an atom in the dictionary. With the above settings of d$_r$ (Eq. 2) and μ$_i$, setting τ=1 means that an additional atom will be added only if it succeeds to eliminate the representation error of more than one data set (the representation cost of one complete data set is $$\frac{|D_i|}{|D_i|} = 1$$

and the representation cost for the data is $$\frac{1}{|D_i|})$$

or alternatively, to eliminate part of the representation error of a few data sets.

We now describe a solution of the cost function shown above according to an embodiment. As the cost function cannot be solved analytically, an iterative algorithm is used. According to an embodiment, each iteration is composed of four steps:

1. Representation: Fix the atoms A and compute {R$_i$|1≤i≤N}.

2. Update: Update each atom A$_i$ separately, assuming all other atoms are fixed.

3. Reduction: Reduce the size of the dictionary by omitting unused atoms, joining atoms that are used in common, and joining similar atoms.

4. Expansion: Expand the dictionary if regularities in the representation error sets are detected.

As will become apparent, parts of the solutions to each of the steps may be only locally optimal to a part of the data, however, they are designed to allow the algorithm to escape local traps by expanding and contracting the overall solution, allowing an increase of the overall cost within the iteration steps, in an annealing like fashion, only to reduce it in subsequent steps. With appropriate hardening of the annealing steps, it is guaranteed to converge. In practice, the algorithm tends to converge to a minimum of the cost function after only several iterations.

Each stage (1-4) of the iteration procedure will now be described. For the representation state, fixing A, we are left with the following problem:

$$R = \underset{\{R_i|1\leq i\leq N\}}{\operatorname{argmin}} \sum_{i=1}^{N}(d_r(D_i, Rep(A, R_i)) + \mu_i|R_i|)$$

This can be minimized by minimizing for each i separately, therefore solving N times:

$$R_i = \underset{R_i}{\operatorname{argmin}}(d_r(D_i, Rep(A, R_i)) + \mu_i|R_i|)$$

For each i, we should find a set of atoms indices, whose union, according to the definition of r is closest to D$_i$. This is an NP-hard combinatorial problem. Accordingly, a 'greedy' iterative approximation algorithm is used according to an embodiment. In each iteration, we choose the atom that, after considering r or more of its elements, best reduces the expression above. This procedure is described in a pseudo-code below:

---

Task: Find a representation for the set D$_i$
Input: A set of K atoms A, a parameter r.
  Set E$_l$ = D$_i$.
  For l = 1, 2, . . . , K:
    denote,
      RC(j$_l$) = d$_r$(E$_l$, Rep(A,{j$_l$})) + μ$_i$ · 1,     (6)
    and find $$j_l = \underset{j_l}{\operatorname{argmin}} RC(j_l) \quad (7)$$

If RC(j$_l$) > RC(j$_{l-1}$); then the additional atom increases the representation error. We exclude it (l = l − 1) and finish (break the for loop).

-continued

```
update E_{l+1} = D_i \ ∪_{U, | i≤l} A_j, where X \ Y is the set
    subtraction operation that returns the set of all elements in X
    that are not elements of Y.
Set R_i = {j_n | n ≤ l}.
```

Hence, a set of atoms is derived whose union, according to the definition of r is closest to $D_i$. In the update stage, each atom is updated in A, assuming all other atoms are fixed. When updating $A_j$, the following problem must be solved:

$$A_j = \underset{A_j}{\operatorname{argmin}} \sum_{i=1}^{N} (d_r(D_i, Rep(A, R_i)) + \mu_i |R_i|) \quad \langle \text{Eqn. 5}\rangle$$

A new atom from some of the representations (if it already exists) can be excluded in this stage, providing the overall cost is improved (see below). The solution of Eq. 5 tries to design a new atom that will reduce the representation error for a subset of the data that uses the inspected atom in its representation, that is $S_j=\{i|j\in R_i\}$. We first define the set of representation errors $E_j$ by the differences between the original sets $\{D_i|i\in S_j\}$ and their representations, excluding the atom $A_j$ to give:

$$E_j = \{D_i \backslash Rep(A, R_i \backslash \{j\}) | i \in S_j\}$$

A new atom $A_j$ is then designed iteratively, where in each iteration $S_j$ and $E_j$ will be updated as the new set of indices that include $A_j$ in their representation, and their corresponding representation error sets. In each stage, the element that is most frequent in the sets $E_j$ is considered, and the representation error of $\{D_i|i\in S_j\}$ is measured. If it is reduced, $S_j$ is updated to include only those samples' indices for which the current version of $A_j$ is appropriate, and $E_j$ is updated accordingly. A description of the algorithm in pseudo-code form is given below:

```
Task: Design a new atom A_j
Input:
    D - a set of samples we would like to best represent by
        the new atom.
    the parameter r.
    Find a pair of elements {e_i,e_j} ∈ T that appear most
        frequently together in the samples D. Set: A_j^2 =
        {e_i,e_j}
    For l = 2,3,...
        Calculate the set of samples' indices R_j^l that
            benefit from using A_j^l in their representation,
                i ∈ R_j^l                                    (10)
                  ⇕
        PCF_r({D_i},{A_j},{l}) < PCF_r({D_i},{A_j},{ })
        Calculate the total error
            E_l = PCF_r(D, {A_j}, R_j^l)                     (11)
        If E_l > E_{l-1}, break.
        Set A_j^{l+1} = A_j^l ∪ t, where t is the most frequent
            element in the samples R_j^l that does not
            already exist in A_j^l.
    Output: A_j^{l-1}, R_j^{l-1}.
```

In the reduction stage, there are three cases where an atom reduction is performed:

Case 1 Reduce atoms that are not being used for representing any (or almost any) of the data objects. These atoms are easily identified by observing the representation sets for example.

Case 2 Join sets of atoms that are jointly used to represent many of the objects. If these are denoted as J, they can be identified by the following expression:

$$\{m, n\} \in J \Leftrightarrow |\{R_i \mid \{m, n\} \subseteq R_i\}| > Thd \cdot \frac{N \cdot L \cdot (L-1)}{K \cdot (K-1)}$$

where Thd is, according to an embodiment, a factor whose value is around 2, L is the average size of all representations, and K is the current number of atoms. Accordingly, it can be seen that $L\cdot(L-1)/K\cdot(K-1)$ is the probability of using two specific atoms in a representation, assuming the atoms are uniformly distributed over the data, and each data uses exactly L atoms in its representation. In such conditions, $N\cdot L\cdot(L-1)/K\cdot(K-1)$ is the expected number of data sets that use two specific atoms together. Twice this value is defined as being 'suspicious' when merging, i.e. no merging takes place if twice this value is exceeded.

Case 3 Join pairs of atoms that share many of their elements, and are mostly used separately. These pairs can be joined without significant increase in the representation error (PCFA) or cost (PCFB).

We identify these pairs by:

$$\{\{n,m\} \| A_n \cap A_m | > \rho \cdot r \cdot \max(|A_n|, |A_m|)\}$$

where ρ is a factor whose value is close to one, according to an embodiment. It should be noted that the values of Thd and ρ noted above are not intended to be limiting, and other alternatives are possible.

For each atom or sets of atoms that hold the above conditions:

let $C_{start}$=PCF of the current settings;

simulate reduction of the atoms by omitting the atom in case (1), or designing a single atom instead the set of atoms J in cases (2) and (3)

check $C_{end}$=PCF of the new setting.

if $C_{end} < C_{start}$ perform the reduction. Otherwise, reconstruct the former settings and continue with the next suspicious atom or set of atoms. Using the above scheme the algorithm checks all possible suspicious cases for reduction, guaranteeing an overall reduction of the cost function.

In each iteration we consider the possibility of adding atoms to the dictionary. Such an act will increase the atoms' cost (PCFC), and might even increase the representation cost (PCFB). Therefore, it will be done only if the decrease in the representation error (PCFA) justifies it. More atoms are added as long as regularities in the representation error sets are identified. According to an embodiment, we define:

$$E = \{D_i \backslash Rep(A, R_i) | 1 \leq i \leq N\}$$

Regularities' are considered when the number of occurrences of a pair of elements in the error sets is much larger than would be expected in a uniform distribution. Assuming uniform distribution, and a specific pair of elements m; n, the number of sets we would expect to include this pair is $N\cdot S\cdot(S-1)/T\cdot(T-1)$, where T is the size of the alphabet and S is the average number of elements in the error sets. If the number of occurrences of one specific pair is larger than twice this number we consider this as a 'regularity', and consider adding another atom. Notice that the assumption of uniform probability of all elements is a very simplifying one, and there might be a need to update this condition to better fit the real data characteristics. However, the accuracy of this condition is not so important, as the total cost function will be measured before and after the addition of each atom, which will be the ultimate condition for it to be added. The new atom design is done using again the 'atom design procedure' described above, where the input are all the N error sets E.

The results can be passed back from the object analyzer to the storage volume. Therefore, according to an embodiment, there is provided an automated method for determining a set of atoms which are representative of the content of a body of content. In a first stage, atoms are generated by taking as input a corpus of documents (although it will be appreciated that fewer than a plurality of documents can be used, such as one for example). That is to say, an input data set is provided to engine 200, which is operable, according to process described above, to generate a set of representative atoms. The atoms derived according to the process for the input object 220 can be used to summarise it, for example, thereby providing processed object 230.

More specifically, this can be thought of as a training phase, in which a user provides a document or corpus of documents as input to the system. The system parses the documents to words, and represents each document by the set of words that are present in the document. Accordingly, each document is a sparse vector (with the size of the vector being the entire dictionary), where there is a "1" in the location of words that are present in the document, and "0" everywhere else. The above-described process is then carried out on the corpus of documents which are now represented as sparse vectors, and the output is a set of atoms, wherein each atom is the size of the dictionary, with "1"s in locations of words included in the atom and "0" every where else.

The atoms can be used for document summarization, for example, where existing document(s), such as an input object 420 for example, and/or new documents are summarized using the atoms which have been generated, perhaps with the addition of new atoms which better represent the content of the new material where appropriate.

In a representation phase, a user can provide a document as input to the system, so that it can be transformed into a sparse vector. Accordingly, the system can then find which atoms from the output best represent the document and provide these atoms as the summarization of the document.

Figure 3:
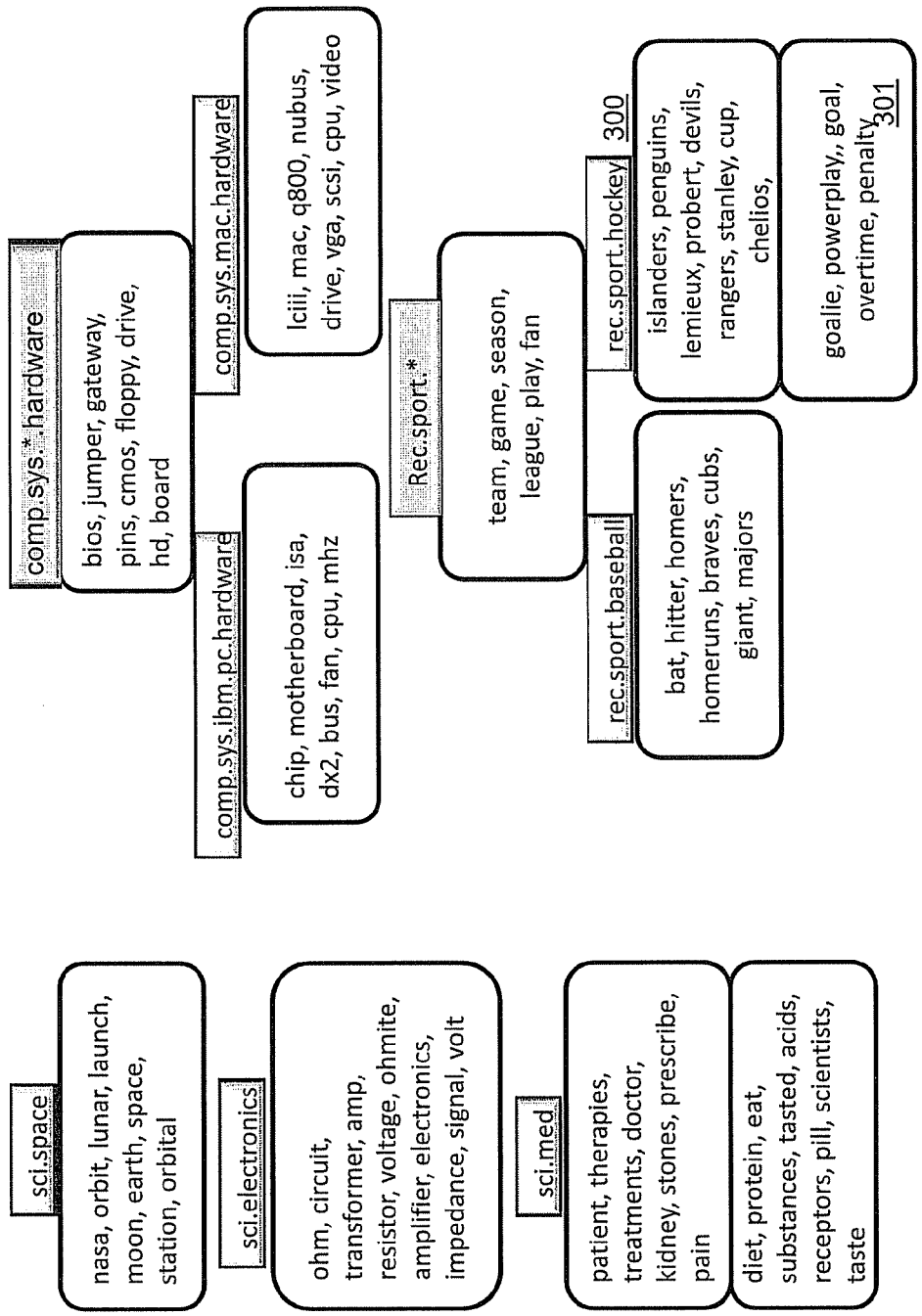
FIG. 3 is a diagram depicting respective sets of atoms and the categories that they were linked to in a corpus of documents that labeled each document into a category.

FIG. 3 is a diagram depicting respective sets of atoms and the categories that they were linked to in a corpus of documents that labeled each document into a category. An exemplary category 300 in FIGS. 3a and 3b is linked to the atoms (301) corresponding to the content of the documents used in an atom generation phase for the category in question.

More specifically, it can be seen that, in FIG. 3 there are groups of atoms which are linked to multiple categories. So, for example, category 300 has an additional atom sets attached to it in addition to 301.

Atoms derived according to an embodiment, such as those exemplified by the sets in FIG. 3, can be used in order to define a keyword representative of the content of a data set. Accordingly, an atom or set thereof for a particular document can be provided as keywords for that document which can be used to speed up searching for example, or otherwise used to more simply represent a document such as on a device on which viewing real estate is limited.

Further it will be appreciated that an initial data set can represent a user, client or customer. That is to say an initial data set can represent a user (customer, client etc) profile, and can further represent a purchase history for that user. Accordingly, a set of atoms generated for the user will therefore provide a representation of the same. It is therefore possible to use the atoms for the user/profile in order to predict an item of interest for the user. The item of interest can be an item suitable for purchase for the user for example.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims below. The words 'document/documents' have been used herein in order to avoid confusion—however, it will be appreciated that a document can comprise other materials which do not fall within the strict definition of such. In particular, a document as described herein can comprise a text book (including text, graphical objects, and specific layouts), magazine or any other printed material which comprises at least textual information, as well as material in digital form, such as electronic books, websites and web pages for example. As such, the above is not intended to be limiting. Furthermore, it should be noted that existing techniques and schemes for identifying the textual elements and other objects of a document (printed or digital) can be used in order to provide a machine readable format for a document which may not initially exist in such a format. It will also be appreciated that the terms document and data set are used interchangeably herein, further emphasizing the intention that the use of document is not intended to be limiting.

What is claimed is:

1. An automated method, comprising:
receiving training data representing an initial data set including text representing at least one concept embodied by the data set;
using the training data in order to generate a set of atoms, each atom comprising at least one word that represents one or more concepts of the initial data set; wherein
generating a set of atoms comprises minimising a cost function using an iterative process to identify one or more atoms.

2. An automated method as claimed in claim 1, wherein an atom is a set of elements that is common in a plurality of data sets such that a new or existing set can be sparsely represented using such atoms.

3. An automated method as claimed in claim 1, wherein the cost function comprises three components respectively defining: an error component for a relationship between a dictionary of atoms, a representation of the data set using the atoms, and the data set; a size of a representation; and the number of atoms.

4. An automated method as claimed in claim 3, wherein the component defining the number of atoms comprises a parameter for controlling how frequently a repetition of an element in a data set must occur in order for the element to become an atom.

5. An automated method as claimed in claim 3, wherein the component defining the size of a representation requires that adding an atom to the representation only occurs if the addition reduces the representation error in more than one element.

6. An automated method as claimed in claim 1, further comprising using an identified atom in order to define a keyword representative of the content of the data set.

7. An automated method as claimed in claim 1, wherein an initial data set represents a user, the method further comprising using an identified atom in order to predict an item of interest for the user.

8. An automated method as claimed in claim 7, wherein the initial data set is a user profile representing a purchase history of a user, such that the predicted item of interest represents an item suitable for purchase for the user.

9. An automated method for generating a dictionary of atoms for an object, an atom comprising a set of elements that is common in a set of samples contained in an input data set, the method comprising:
generating a data representation for the object and a corresponding cost function; and
minimizing the cost function using iterative process.

10. An automated method as claimed in claim 9, wherein the dictionary of atoms is used to represent a further object.

11. An automated method as claimed in claim 9, wherein the iterative process runs for a predetermined number of iterations or until the process converges at a predefined value, such that a resultant set of atoms is output from the iteration with the minimal cost value.

12. An automated method as claimed in claim 9, further comprising using an atom in order to define a keyword representative of the content of the data set.

13. An automated method as claimed in claim 9, wherein the initial data set represents a user, the method further comprising using an atom in order to predict an item of interest for the user.

14. An automated method as claimed in claim 13, wherein the initial data set is a user profile representing a purchase history of a user, such that the predicted item of interest represents an item suitable for purchase for the user.

15. A computer implemented method of determining a representative set of atoms comprising:
- receiving training data representing an initial data set including text representing at least one concept embodied by the data set;
- processing the training data in order to generate a set of atoms, each atom comprising at least one word that represents one or more concepts of the initial data set; wherein
- generating a set of atoms comprises minimising a cost function using an iterative process to identify one or more atoms.

16. A program product containing instructions that, when executed on a computer, perform a method for generating a dictionary of atoms for an object, an atom comprising a set of elements that is common in a set of samples contained in an input data set, by:
- generating a data representation for the object and a corresponding cost function; and
- minimizing the cost function using iterative process.

* * * * *